(12) United States Patent
Shimoyama et al.

(10) Patent No.: US 7,365,706 B2
(45) Date of Patent: Apr. 29, 2008

(54) IMAGE COMPOSITION APPARATUS AND METHOD

(75) Inventors: Tomohiko Shimoyama, Tokyo (JP); Kenji Morita, Kanagawa (JP); Hiroki Yonezawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/658,335

(22) Filed: Sep. 10, 2003

(65) Prior Publication Data

US 2004/0056870 A1 Mar. 25, 2004

Related U.S. Application Data

(63) Continuation of application No. PCT/JP02/02298, filed on Mar. 12, 2002.

(30) Foreign Application Priority Data

Mar. 13, 2001 (JP) ............................. 2001-071121

(51) Int. Cl.
*G09G 5/00* (2006.01)
*G09G 5/02* (2006.01)
(52) U.S. Cl. .................. 345/8; 345/7; 345/8; 345/633; 348/115
(58) Field of Classification Search ................ 345/7–9, 345/633
See application file for complete search history.

(56) References Cited

U.S. PATENT DOCUMENTS

| 4,758,892 A | 7/1988 | Bloomfield ................. 358/183 |
| 4,797,942 A | 1/1989 | Burt ............................ 382/41 |
| 5,815,411 A | 9/1998 | Ellenby et al. ............. 364/559 |
| 6,297,856 B1 | 10/2001 | Nakamura et al. .......... 348/705 |
| 6,597,389 B2 | 7/2003 | Tanaka et al. ........... 348/14.08 |
| 6,611,285 B1 | 8/2003 | Morita ..................... 348/211.3 |

(Continued)

FOREIGN PATENT DOCUMENTS

EP 117 074 A2 7/2001

(Continued)

OTHER PUBLICATIONS

Notice of Transmittal of International Search Report (PCT/JP 02/02298) dated Aug. 6, 2002.

(Continued)

*Primary Examiner*—Duc Dinh
(74) *Attorney, Agent, or Firm*—Fitzpatrick, Cella, Harper & Scinto (57) ABSTRACT

An image composition system includes an HMD (100) having a right-eye camera (110), a left-eye camera (111), a right-eye LCD (130) and a left-eye LCD (131) for displaying a real image, and the like, and an information processing apparatus (300) for generating another image different from the real image. A composite image obtained by superimposing the other image generated by the information processing apparatus (300) on the real image captured by the right-eye camera (110) and left-eye camera (111) is displayed on the right-eye LCD (130) and left-eye LCD (131). The display region of the other image is determined based on the position and posture of the head of the user who wears the HMD (100). The user can observe the other image superimposed on the real image at an appropriate position while wearing the HMD on his or her head.

15 Claims, 10 Drawing Sheets

U.S. PATENT DOCUMENTS 6,847,336 B1 * 1/2005 Lemelson et al. ............. 345/8
2002/0154070 A1 10/2002 Sato et al. .................... 345/8

FOREIGN PATENT DOCUMENTS

WO     WO 97/03416     1/1997

WO     WO 02/073954 A1     9/2002

OTHER PUBLICATIONS

Fukumoto, "Finger Pointing"; Pointing Interface by image processing, Compt. & Graphics, vol. 18, No. 5, pp. 633-642 (1994).

Notice of Transmittal of International Preliminary Examination Report (PCT/JP 02/02298) dated May 26, 2003.

* cited by examiner

IMAGE COMPOSITION APPARATUS AND METHOD

TECHNICAL FIELD

The present invention relates to an image composition apparatus that displays a real image superimposed with another image on a display unit of display means to be worn on a head.

BACKGROUND ART

Conventionally, upon shooting movie or television program scenes, a performer acts according to memorized script contents. After shooting one scene, a director gives directions about that scene to the performer, the performer confirms the directions while observing playback of a video of himself or herself, and shooting progresses while reflecting those directions in action. In such process, shooting is made.

However, it is a heavy burden for a performer to memorize the script contents. Since the director gives directions after shooting one scene, the performer cannot receive fine directions from the director during action. Also, the performer cannot see a video of himself or herself, i.e., how he or she is acting, during shooting.

DISCLOSURE OF INVENTION

It is an object of the present invention to provide an image composition apparatus which allows a user to observe a real image superimposed with another image while wearing a display on his or her head. Note that the real image may be either an image which is taken by a video camera provided to the display that the user wears on the head, and is displayed on the display (to be referred to as video see-through hereinafter), or a real space observed via the display (to be referred to as optical see-through hereinafter).

It is another object of the present invention to display another image to be superimposed at a position that does not disturb observation of a real image.

It is still another object of the present invention to turn on/off superimposed display and to switch displayed contents by a predetermined gesture of a person who wears the display, and to improve operability.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE OF CARRYING OUT THE INVENTION

Preferred embodiments of the present invention will now be described in detail in accordance with the accompanying drawings.

Figure 1:
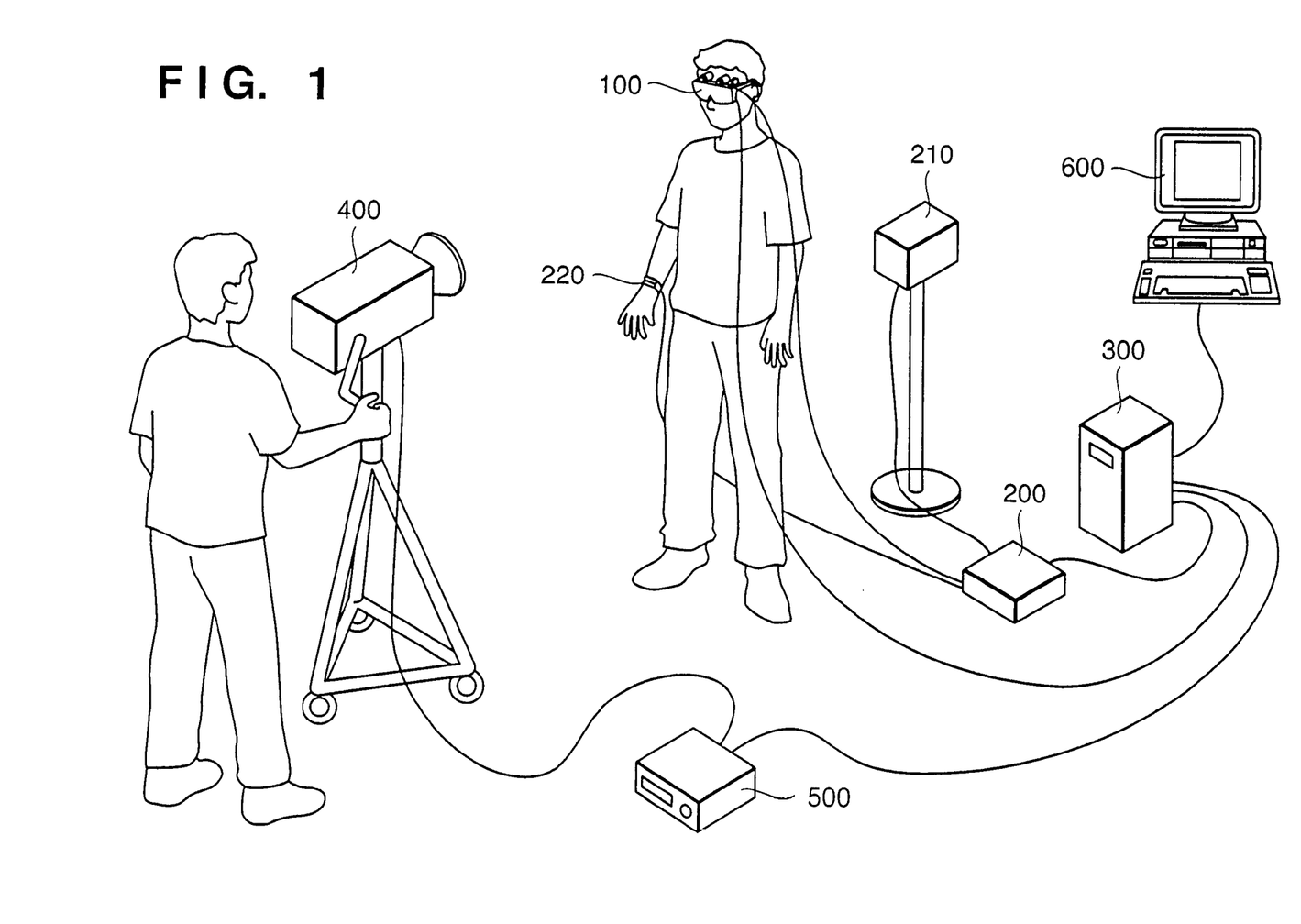
FIG. 1 shows a use example of an image composition apparatus according to an embodiment of the present invention.
Figure 2:
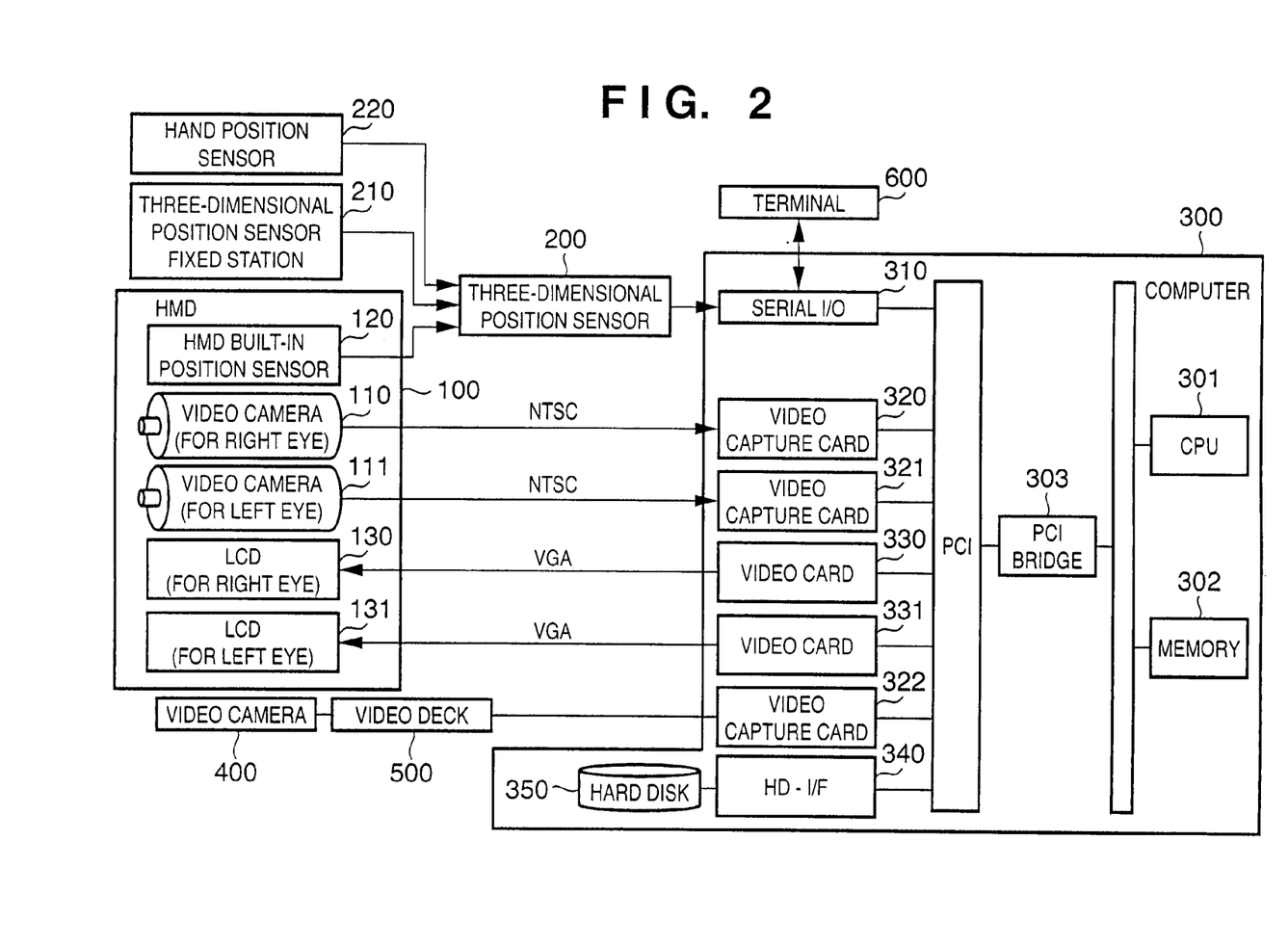
FIG. 2 is a block diagram showing the use example of FIG. 1.
Figure 3A:
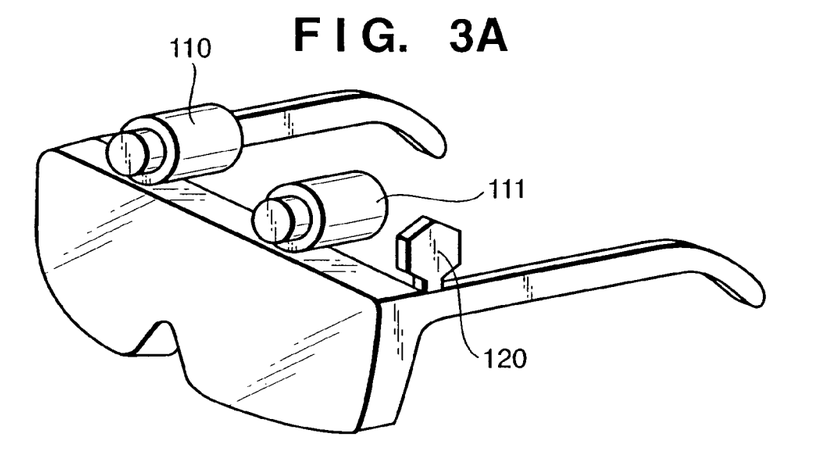
FIG. 3A is a perspective view of an HMD (Head Mount Display) in FIGS. 1 and 2 when viewed from the front side.
Figure 3B:
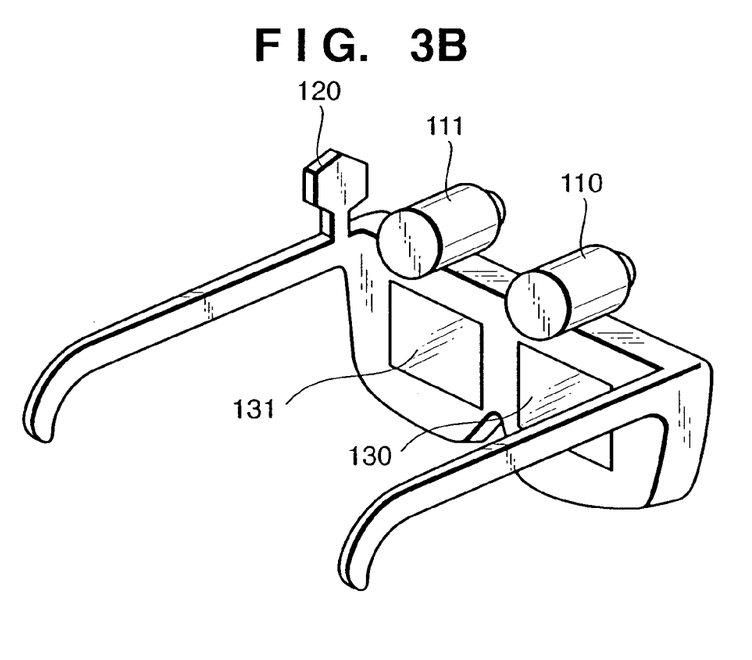
FIG. 3B is a perspective view of the HMD (Head Mount Display) in FIGS. 1 and 2 when viewed from the rear side.

FIG. 1 shows an example of the system arrangement of an image composition apparatus according to an embodiment of the present invention. FIG. 2 is a block diagram showing the system arrangement in FIG. 1. FIGS. 3A and 3B are perspective views showing an HMD (Head Mount Display) in FIGS. 1 and 2, in which FIG. 3A is a perspective view of the HMD when viewed from the front side, and FIG. 3B is a perspective view of the HMD when viewed from the rear side.

Reference numeral 100 denotes an HMD (Head Mount Display) a person wears on his or her head; 200, a three-dimensional position sensor main body; 210, a three-dimensional position sensor fixed station; 220, a hand position sensor; 300, an information processing apparatus; 400, a video camera; 500, a video deck; and 600, a terminal. These components constitute an image composition apparatus.

The HMD 100 is an eyeglass-type image display apparatus that adopts a video see-through system. This HMD 100 comprises a right-eye camera 110, left-eye camera 111, HMD built-in sensor (three-dimensional sensor mobile station) 120, right-eye LCD (Liquid crystal display) 130, and left-eye LCD 131. Note that the HMD 100 may adopt a combination of an optical see-through HMD and video camera in place of the video see-through HMD.

Figure 4:
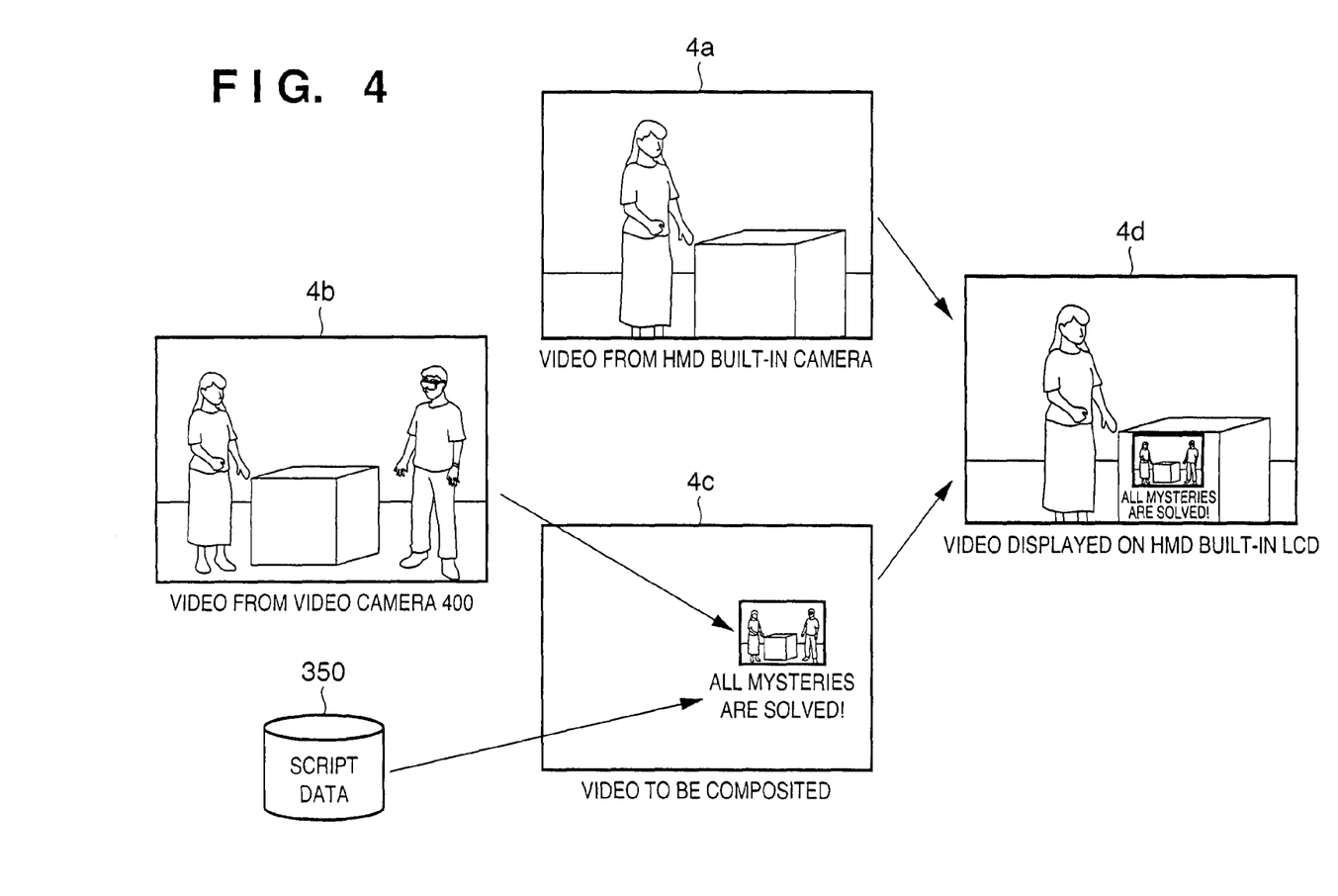
FIG. 4 shows the generation processes of a video to be superimposed on the HMD.

The right-eye camera 110 of the HMD 100 is connected to a video capture card 320 of the information processing apparatus 300, and the left-eye camera 111 is connected to a video capture card 321 of the information processing apparatus 300. The right-eye LCD 130 is connected to a video card 330 of the information processing apparatus 300, and the left-eye LCD 131 is connected to a video card 331 of the information processing apparatus 300. The LCDs 130 and 131 display a composite video of those actually captured by the left-eye camera 111 and right-eye camera 110, and, for example, script data or a video from the video camera 400 (FIG. 4).

The video to be displayed on the HMD 100 is generated by the information processing apparatus 300. The information processing apparatus 300 comprises a CPU 301, memory 302, PCI bridge 303, hard disk I/F 340, hard disk 350, and the like in addition to a serial I/O 310, the video capture cards 320, 321, and 322, and video cards 330 and 331 mentioned above.

The three-dimensional position sensor 200 comprises the three-dimensional position sensor fixed station 210 and the three-dimensional sensor mobile station 120 which is built in the HMD. The three-dimensional position sensor 200 measures the relative position between the three-dimensional position sensor fixed station 210 and three-dimensional sensor mobile station 120 by magnetism. Position information has six degrees of freedom: X, Y, Z, ROLL, PITCH, and YAW. The three-dimensional position sensor main body 200 communicates with the information processing apparatus 300 via a serial interface. The position of the three-dimensional position sensor fixed station 210 is precisely measured in advance, and the absolute position (to have the center of a studio as an origin) of the HMD can be detected by detecting the relative position of the three-dimensional sensor mobile station 120.

The three-dimensional sensor mobile station 120 is connected to the three-dimensional position sensor main body 200. The three-dimensional position sensor fixed station 210 is connected to this three-dimensional position sensor main body 200, and the hand position sensor 220 that the person who wears the HMD 100 wears on the hand is further connected. The hand position sensor 220 has the same structure as the three-dimensional sensor mobile station 120, and is also connected to the three-dimensional position sensor main body 200. In this embodiment, the hand position sensor 220 and three-dimensional position sensor 200 communicate with each other by magnetism. The three-dimensional position sensor main body 200 is further connected to the serial I/O 310 of the information processing apparatus 300. These sensors measure both the posture of a person who wears the HMD 100, and the position of the HMD 100.

This embodiment uses a magnetic position sensor which is separated into a fixed station and position sensor, but may use a position sensor using a gyro as long as it can measure the position of the HMD. The terminal 600 is used to input instructions from a staff member or to input shooting start and stop instructions.

The configuration of programs which run on the information processing apparatus 300 will be explained below. In the following description, assume that a performer wears the HMD 100 in rehearsal upon shooting a movie or television program.

Figure 5:
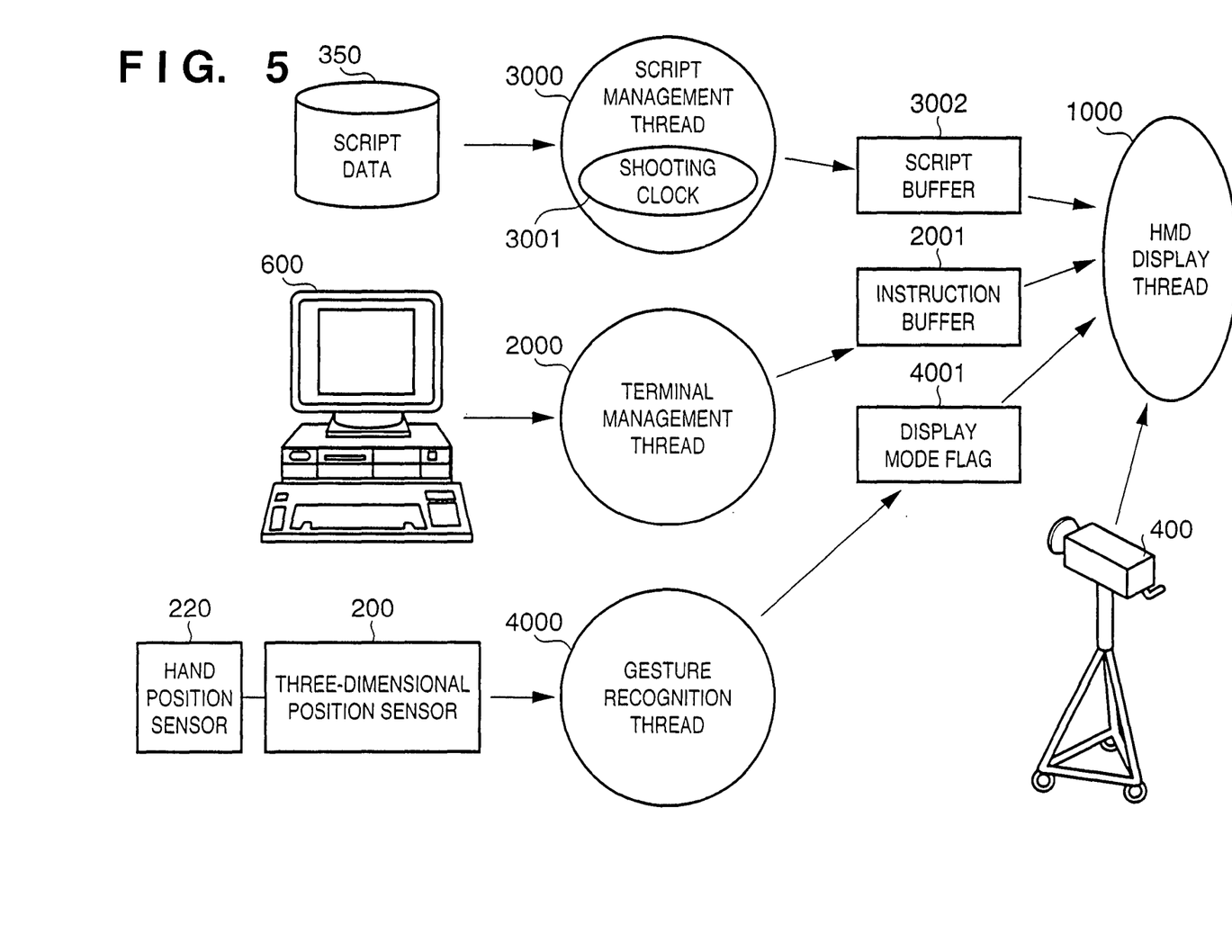
FIG. 5 is a diagram showing the configuration of programs which run on an information processing apparatus 300 shown in FIG. 2.

FIG. 5 shows the configuration of programs which run on the information processing apparatus 300 in FIG. 2. The programs include an HMD display thread 1000, terminal management thread 2000, script management thread 3000, and gesture recognition thread 4000. Data are exchanged among the threads via an instruction buffer 2001, script buffer 3002, and display mode flag 4001.

The HMD display thread 1000 displays videos captured by the right-eye camera 110 and left-eye camera 111 on the LCDs 130 and 131. In this case, the thread 1000 superimposes an instruction from a staff member written in the instruction buffer 2001 or script data written in the script buffer 3002. Also, an image taken by the television camera 400 is also superimposed.

Figure 6:
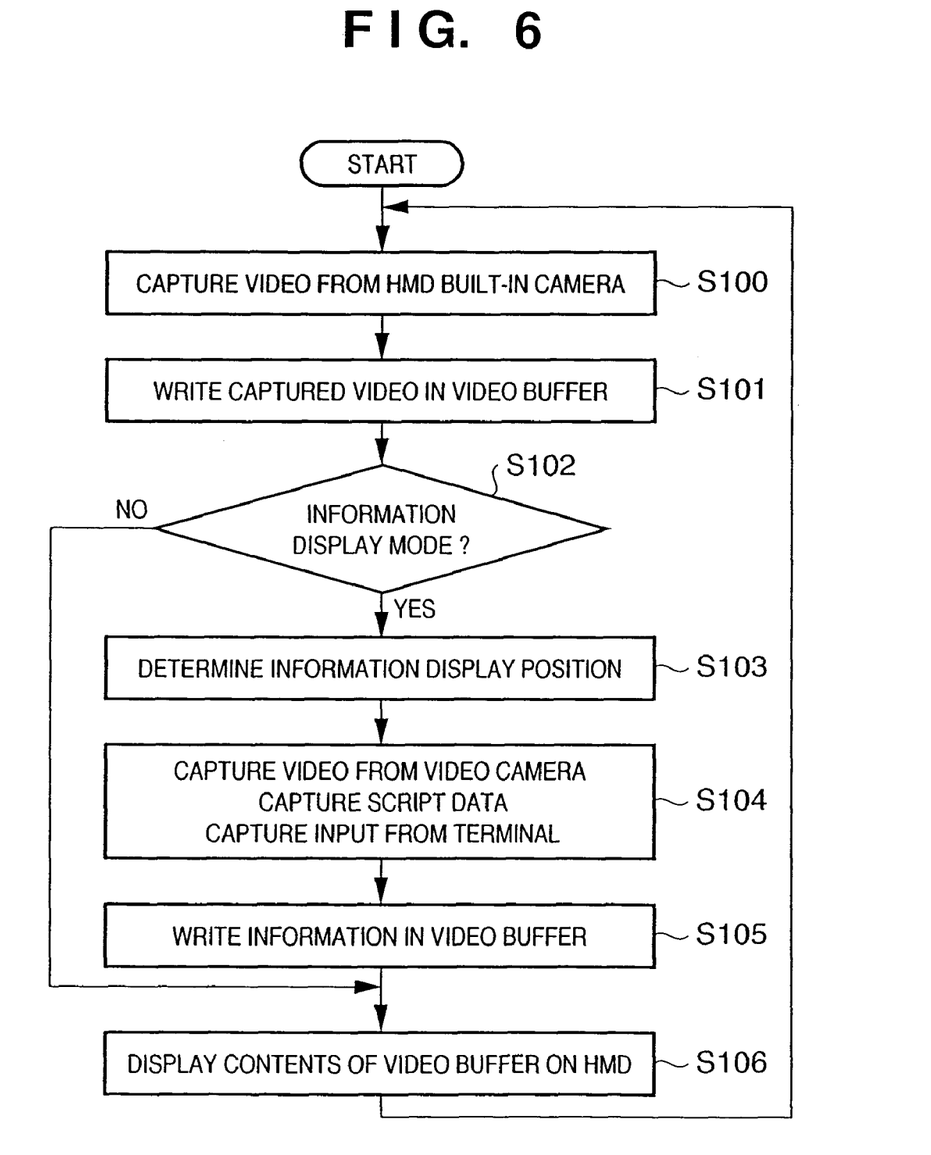
FIG. 6 is a flow chart showing the process of an HMD display thread 1000 shown in FIG. 5.

The process of the HMD display thread 1000 will be explained below. FIG. 6 is a flow chart showing the process of the HMD display thread 1000 in FIG. 5.

Note that the processes that pertain to the eyes of a person who wears the HMD 100 have no difference for the right and left eyes, and are basically the same. Hence, the process for the right eye will be explained below.

A video from the video camera 100 is captured by the information processing apparatus 300 via the video capture card 320 (step S100). The captured video is written on a video buffer on the memory 302 (step S101). This video buffer is a work area for storing a video during generation. By writing the captured actually taken video, an actually taken video can be used as a background image.

It is checked if an information display mode for displaying information such as a video from the video camera 400, a script, an instruction from a staff member, or the like is set. If the information display mode is set, an information display process starts (step S102).

In the information display process, the display position of information is determined to be a position where information does not disturb the performer (step S103). In this embodiment, the display position of information is set to be a position where information overlaps a table, the coordinate position of which is known, so that the information does not occlude another performer. Note that determination method of the information display position will be explained later.

After the information display position is determined, a video from the video camera 400, script data 350, and an instruction from a staff member via the terminal 600 are captured (step S104), and the captured information is written in a video buffer area corresponding to the determined display position (step S105). Since the video from the HMD 100 has already been written in the video buffer, information is superimposed on that video.

Upon completion of rendering, the contents of the video buffer are transferred to a frame buffer on the video board 330 to display (render) the contents (video) of the video buffer on the LCD 130 in the HMD 100 (step S106).

The determination method of the information display position in step S103 will be described below.

Figure 7:
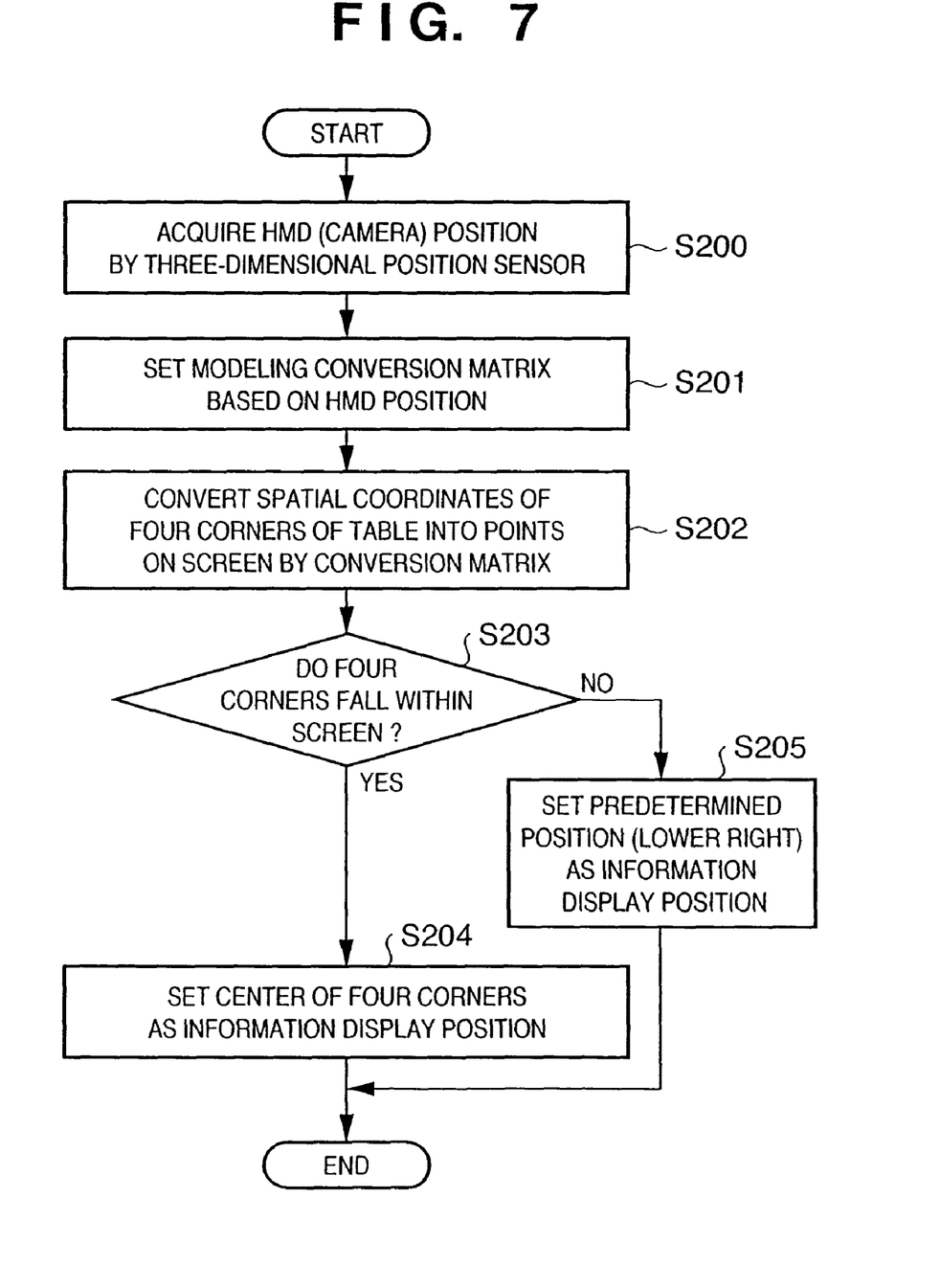
FIG. 7 is a flow chart showing the process for determining a display position in step S103 in FIG. 6.

FIG. 7 is a flow chart of the process for determining the information display position in step S103 in FIG. 6.

The position of the HMD 100 is acquired from the three-dimensional sensor main body 200 (step S200). The information processing apparatus 300 generates and sets a modeling conversion matrix on the basis of the position acquired in step S200, the coordinate position of the HMD 100, and parameters such as the focal length of the camera and the like, which are measured in advance, so as to obtain an image from the viewpoint of the HMD 100 (step S201). Note that the "position and posture of the viewpoint of an observer", which are required to estimate a real image that a person who wears the HMD 100 observes, are detected using the HMD built-in position sensor 120 in this embodiment, but the present invention is not limited to such specific method. A position sensor separate from the HMD 100 may be attached to the head of the person to detect the position and posture of the head.

The generated modeling conversion matrix converts the known coordinates of the four corners of the table into points on the screen of the LCD 130 (step S202). With this conversion, the display positions of the four corners of the table within the screen of the HMD 100 can be determined.

It is checked if all the four corners fall within the screen (step S203). If all the four corners fall within the screen (YES in step S203), the center of the four corners is set to be the information display position (step S204). In this way, information is displayed on the table. If the four corners do not fall within the screen (NO in step S203), a predetermined lower right position is set to be the central position of information display (step S205).

An example of the aforementioned image composition process will be explained below with reference to FIG. 4. FIG. 4 shows a state wherein a video 4b taken by the video camera 400, and information from the script data 350 are superimposed on a video 4a obtained by the video cameras 110 and 111 of the HMD 100. With the process in step S103 mentioned above, the display position of the video from the video camera 400 and information from the script data 350 are determined to be the center of the four corners of the table, and the video and the information are rendered, as indicated by a video 4c. The videos 4a and 4c are composited to obtain a video 4d, which is observed by the person who wears the HMD 100. Note that FIG. 4 typically illustrates the respective videos, and some of the video contents, composite positions, and the like are not accurate.

In this embodiment, as described previously, since the information is superimposed on the table, the coordinate position of which is known, the field of view of the performer can be prevented from being intercepted. Display of information on the table does not limit the present invention. For example, information may be superimposed on a portion of a wall, the coordinate position of which is known. Furthermore, the position of the display can be dynamically changed. For example, the position of the display may be changed from a desk to a wall.

The terminal management thread 2000 in FIG. 5 mainly processes an input from the terminal 600, and writes an instruction from a staff member to the performer via the terminal 600 in the instruction buffer 2001. At the same time, the terminal management thread 2000 informs the script management thread 3000 of staff member's operations.

The process of the terminal management thread 2000 will be described below.

Figure 8:
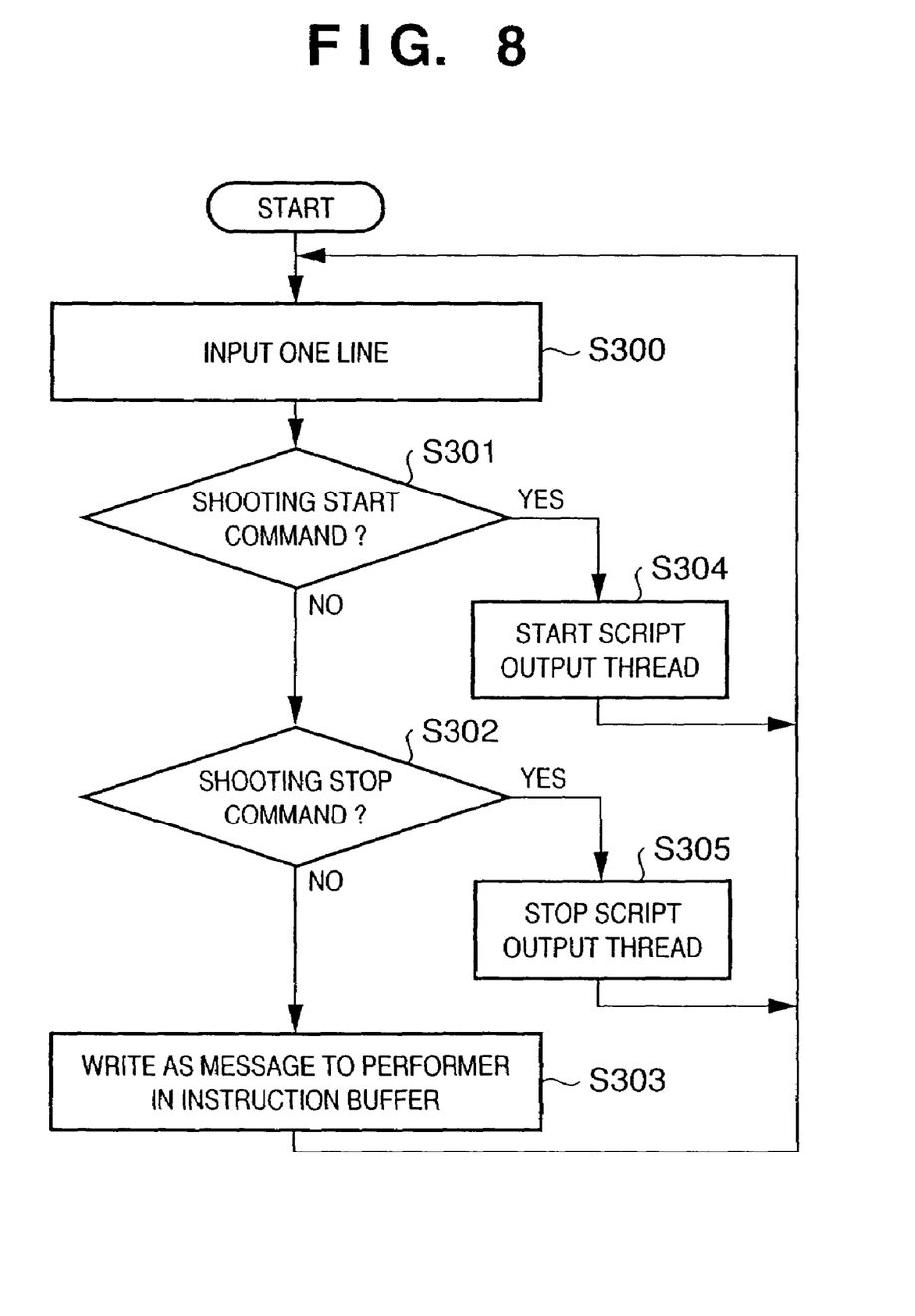
FIG. 8 is a flow chart showing the process of a terminal management thread 2000 in FIG. 5.

FIG. 8 is a flow chart showing the process of the terminal management thread 2000 in FIG. 5.

The terminal management thread 2000 normally waits for an input from the terminal 600 (step S300). In this embodiment, a shooting start or stop command or the like is issued by inputting a character string to the terminal 600. However, the present invention is not limited to such specific instruction method to the terminal 600, and various other known user interfaces may be used.

It is checked if an input character string is a shooting start command (step S301). If the input character string is a shooting start command, a script output thread starts (step S304). If it is determined as a result of checking in step S301 that the input character string is not a shooting start command, it is checked if the input character string is a shooting stop command (step S302). If the input character string is a shooting stop command, the script output thread stops (step S305). If it is determined as a result of checking in step S302 that the input character string is not a shooting stop command, it is determined that the input character string is an instruction from a staff member to the performer, and that character string is written in the instruction buffer 2001 (step S303). After that, the flow returns to step S300.

The script management thread 3000 writes script data stored in the hard disk 350 in the script buffer 3002 at timings according to time stamps stored in the script data. The script data is stored as a sequence of sets of time stamps and character strings to be displayed at those timings.

The process of the script management thread 3000 will be described below.

Figure 9:
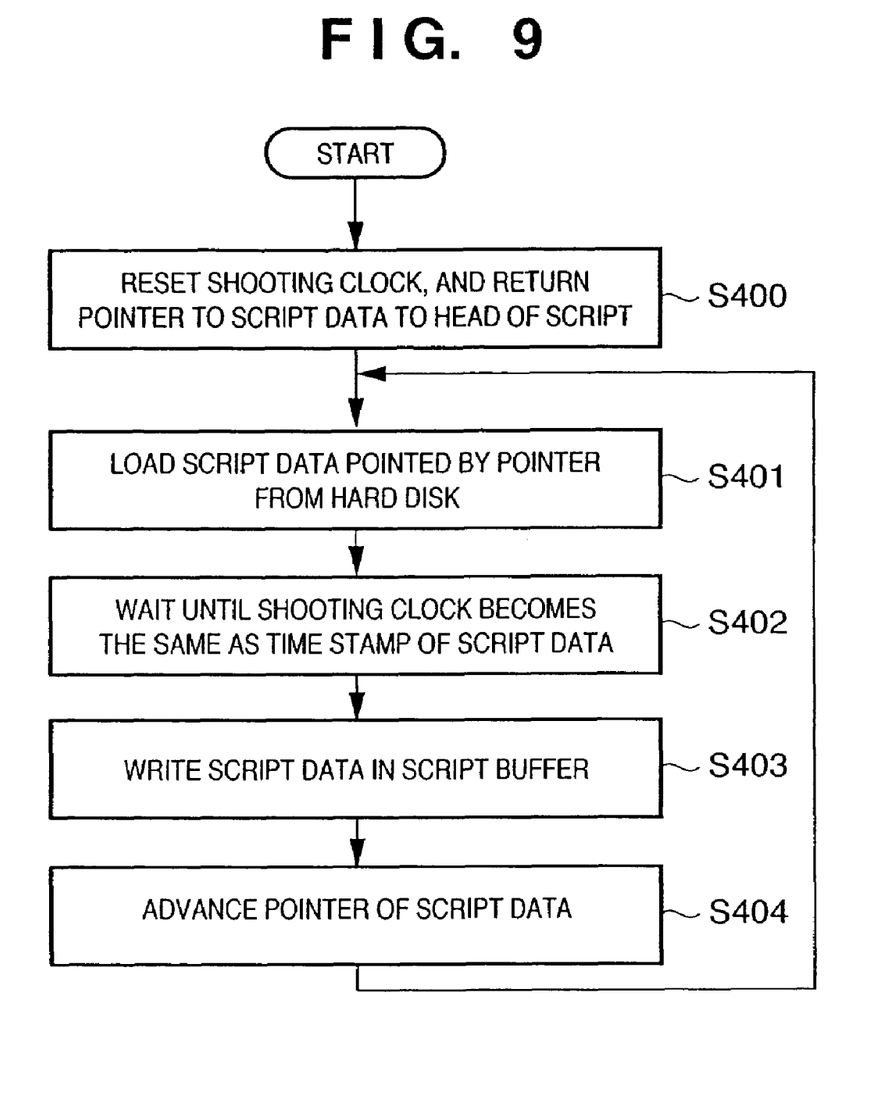
FIG. 9 is a flow chart showing the process of a script management thread 3000 in FIG. 5.

FIG. 9 is a flow chart showing the process of the script management thread 3000 in FIG. 5.

As an initial setup process, an internal shooting clock 3001 is reset to zero, and a pointer of script data is returned to the head of the script (step S400).

Data (next script data to be displayed) pointed by the pointer of the script data is loaded from the hard disk 350 (step S401). The control waits until the shooting clock 3001 becomes the same as the time stamp of the script data pointed by the pointer (step S402).

The script data pointed by the pointer is written in the script buffer (step S403). The pointer of the script data is advanced (step S404), and the flow returns to step S401 to repeat the aforementioned steps.

The gesture recognition thread 4000 in FIG. 5 recognizes a gesture (hand position and posture) of the performer on the basis of the position of the hand position sensor 220 obtained via the three-dimensional position sensor main body 200. Every time a gesture is recognized, the display mode flag 4001 is turned on/off.

In this embodiment, as a gesture for turning on/off display, an action for moving the hand up and down three times for a second is selected.

Figure 10:
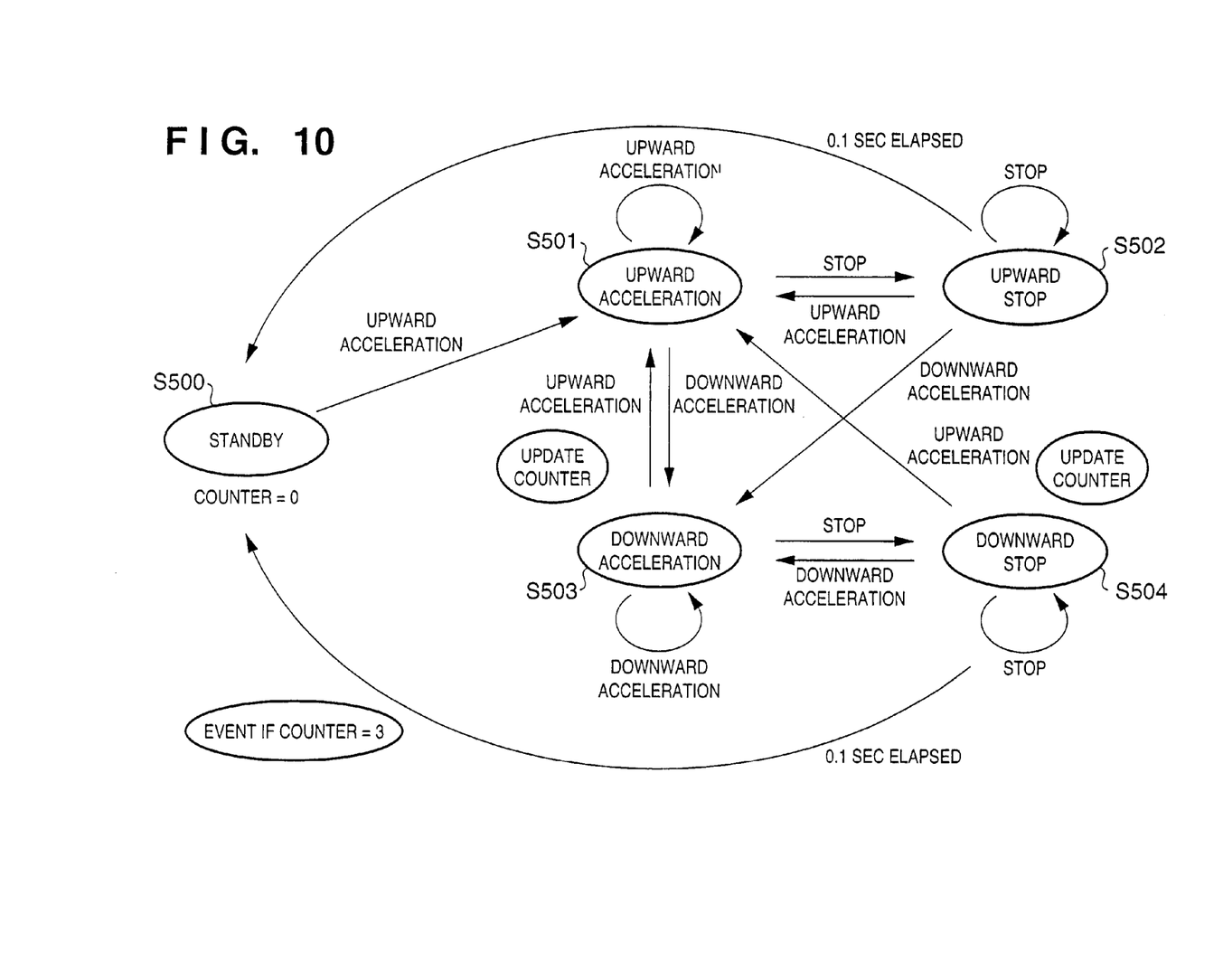
FIG. 10 is a state transition chart showing transition of the state of a gesture recognition thread 4000.

FIG. 10 is a state transition chart showing transition of the state of the gesture recognition thread 4000.

The gesture recognition thread 4000 is normally in a "standby state S500". At this time, an internal counter for counting upward and downward actions of the hand is cleared to zero. Upon detecting an upward acceleration from the hand position sensor 220, the gesture recognition thread 4000 transits to an "upward acceleration state S501".

When the acceleration has stopped, the gesture recognition thread 4000 transits to an "upward acceleration stop state S502". However, if an upward acceleration is detected again within 0.1 sec after transition, the gesture recognition thread 4000 returns to the "upward acceleration state S501".

If no acceleration is detected within 0.1 sec after transition to the "upward acceleration stop state S502", it is determined that the action detected is merely an upward movement of the hand but is not a gesture, and the gesture recognition thread 4000 transits to the "standby state S500".

When an upward acceleration is detected in the "upward acceleration stop state S502", the gesture recognition thread 4000 transits to the "upward acceleration state S501".

When a downward acceleration is detected in the "upward acceleration stop state S502", the gesture recognition thread 4000 transits to a "downward acceleration state S503". When the acceleration has stopped, the gesture recognition thread 4000 transits to a "downward acceleration stop state S504". When a downward acceleration is detected again within 0.1 sec after transition, the gesture recognition thread 4000 returns to the "downward acceleration state S503".

When an upward acceleration is detected in the "downward acceleration stop state S504", the gesture recognition thread 4000 transits to the "upward acceleration state S501". At this time, the internal counter is incremented. This corresponds to a case wherein the hand is moved downward after upward movement.

When no acceleration is detected within 0.1 sec after transition to the "downward acceleration stop state S504", the gesture recognition thread 4000 transits to the "standby state S500". If counter=3, it is determined that the gesture is complete, and an event is generated to invert the value (TRUE/FALSE) of the display mode flag 4001.

The gesture recognition thread 4000 executes the process according to the aforementioned state transition chart to detect an event. In the above description, a full-superimpose display ON/OFF instruction is issued by a gesture. However, for example, display of script data, instruction data, and video camera image may be individually turned on/off, as is known to those who are skilled in the art.

As described above, according to the image composition apparatus of this embodiment, various kinds of information can be given to the performer by superimposing a desired image.

Such information can be displayed at a position (e.g., on the wall of a shooting background) where the displayed information does not disturb the field of view of the performer.

In this way, the performer can confirm lines, director's instruction, taken video, and the like without largely moving the line of sight, and the load on the performer can be reduced.

The performer can act while observing a video which is being taken by a cameraman, and which cannot so far be confirmed until after action.

Furthermore, since display of such information can be turned on/off by a performer's gesture, information can be easily displayed at a desired timing in rehearsal.

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described in detail above, according to the image composition apparatus, since another image is displayed on a display unit that displays a real image, the other image can be superimposed on the real image. Hence, the user who wears display means on the head can observe the other image superimposed on the real image.

When text information is displayed as the other image, a text instruction can be given to the user who wears the display means on the head.

The other image can be an image from a viewpoint other than that of the user who wears the display means, which is taken by image taking means (television camera 400). For this reason, when this image taking means takes an image of the user who wears the display means on the head, the user can confirm his or her actions in real time.

Superimpose display of the other image in the HMD 100 is turned on/off on the basis of the hand position, hand movement, posture, and the like of the user who wears the display means. For this reason, the user can easily turn on/off superimpose display of the other image according to his or her will by changing the hand position and posture.

Since the superimpose display region of the other image is determined based on the posture of the user who wears the display means, the other image can be displayed at a position where that image does not disturb the user.

As many apparently widely different embodiments of the present invention can be made without departing from the spirit and scope thereof, it is to be understood that the invention is not limited to the specific embodiments thereof except as defined in the claims.

The invention claimed is:

1. An image composition system for compositing a real image corresponding to a position of a display unit with another image, said system comprising:
   the display unit, which is wearable on a head of a user, and displays a composite image;
   a position sensor for detecting the position of the display unit, and position information;
   a determination unit for determining a display region where the other image is to be displayed, in accordance with position information; and
   a composition unit for compositing the other image on the determined display region,
   wherein the other image is used to display information that helps operations of the user, and
   wherein said determination unit comprises:
   (a) a setting unit for setting a space region for displaying the other image in the real space; and
   (b) a conversion unit for converting the space region set by said setting unit into the display region on said display unit on the basis of a position and posture of the user.

2. The system according to claim 1, wherein said display unit has an optical see through structure, and the user can observe the real space via said display unit.

3. The system according to claim 1, further comprising: a first image taking device for obtaining a video of the real space observed from a viewpoint of the user, and
   wherein said composition unit displays the video obtained by said first image taking device on said display unit, and superimposes the other image on the display region determined by said determination unit.

4. The system according to claim 1, wherein the information is a video obtained by a second image taking device for taking an image from a viewpoint other than a viewpoint of the user.

5. The system according to claim 1, wherein the information is dialog information.

6. The system according to claim 1, wherein the information is an image obtained by taking an image of an action of the user.

7. An image composition system for compositing a real image corresponding to a position of a display unit with another image, said system comprising:
   the display unit, which is wearable on a head of a user, and displays a composite image;
   a position sensor for detecting the position of the display unit, and outputting position information;
   a determination unit for determining a display region where the other image is to be displayed, in accordance with the position information;
   a composition unit for compositing the other image on the determined display region, wherein the other image is used to display information that helps operations of the user, and wherein the information is text information; and
   a memory for holding a pair of the text information and time information indicating a display timing of the text information,
   wherein said composition unit switches the text information to be displayed on the display region in accordance with the time information held by said memory.

8. An image composition system for compositing a real image corresponding to a position of a display unit with an other image, said system comprising:
- the display unit, which is wearable on a head of a user, and displays a composite image;
- a position sensor for detecting the position of the display unit, and outputting position information;
- a determination unit for determining a display region where the other image is to be displayed, in accordance with the position information;
- a composition unit for compositing the other image on the determined display region, wherein the other image is used to display information that helps operations of the user; and
- a gesture detection unit capable of detecting a predetermined action of the user,
- wherein said composition unit performs turn on/off display control of the other image in response to a predetermined action detected by said gesture detection unit.

9. The system according to claim 8, wherein said composition unit switches contents of the other image to be displayed on the display region in response to a predetermined action detected by said gesture detection unit.

10. An information processing method of displaying a composite image of a real image corresponding to a position of a display unit and an other image on the display unit, which is wearable on a head of a user, said method comprising the steps of:
- detecting the position of the display unit, and outputting position information;
- determining a display region where the other image is to be displayed, in accordance with the position information;
- compositing the other image on the determined display region, wherein the other image is used to display information that helps operations of the user, and wherein the information is text information; and
- holding in a memory a pair of the text information and time information indicating a display timing of the text information,
- wherein said compositing step switches the text information to be displayed on the display region in accordance with the time information held by the memory.

11. A computer-readable medium that stores a computer-executable program for making a computer execute the information processing method according to claim 10.

12. An information processing method of displaying a composite image of a real image corresponding to a position of a display unit and an other image on the display unit, which is wearable on a head of a user, said method comprising the steps of:
- detecting the position of the display unit, and position information;
- determining a display region where the other image is to be displayed, in accordance with position information; and
- compositing the other image on the determined display region, wherein the other image is used to display information that helps operations of the user, wherein said determining step comprises:
  - (a) a setting step of setting a space region for displaying the other image in a real space; and
  - (b) a converting step of converting the space region set by said setting step into the display region on the display unit on the basis of a position and posture of the user.

13. A computer-readable medium that stores a computer-executable program for making a computer execute the information processing method according to claim 12.

14. An information processing method of displaying a composite image of a real image corresponding to a position of a display unit and an other image on the display unit, which is wearable on a head of the user, said method comprising the steps of:
- detecting the position of the display unit, and outputting position information;
- determining a display region where the other image is to be displayed, in accordance with the position information;
- compositing the other image on the determined display region, wherein the other image is used to display information that helps operations of the user; and
- a gesture detecting step of detecting a predetermined action of the user,
- wherein said compositing step performs turn on/off display control of the other image in response to a predetermined action detected by said gesture detecting step.

15. A computer-readable medium that stores a computer-executable program for making a computer execute the information processing method according to claim 14.

* * * * *

UNITED STATES PATENT AND TRADEMARK OFFICE
CERTIFICATE OF CORRECTION

| | |
|---|---|
| PATENT NO. | : 7,365,706 B2 |
| APPLICATION NO. | : 10/658335 |
| DATED | : April 29, 2008 |
| INVENTOR(S) | : Tomohiko Shimoyama et al. |

It is certified that error appears in the above-identified patent and that said Letters Patent is hereby corrected as shown below:

<u>ON THE TITLE PAGE, AT ITEM (56), FOREIGN PATENT DOCUMENTS</u>:
"117 074 A2" should read --1 117 074 A2--.

<u>COLUMN 8</u>:
Line 13, "and position" should read --and outputting position--.
Line 16, "with" should read -- with the--.
Line 29, "see through" should read --see-through--.

<u>COLUMN 10</u>:
Line 6, "and position" should read --and outputting position--.
Line 9, "with" should read --with the--.

Signed and Sealed this

Twenty-third Day of December, 2008

JON W. DUDAS
*Director of the United States Patent and Trademark Office*